P. W. GATES.
STONE BREAKING MACHINE.

No. 272,233. Patented Feb. 13, 1883.

Witnesses:
J. P. Th. Lang.
R. Munson

Inventor:
Philetus W. Gates
by Mason Fenwick Lawrence
Attys

UNITED STATES PATENT OFFICE.

PHILETUS W. GATES, OF CHICAGO, ILLINOIS, ASSIGNOR TO THE GATES & SCOVILLE IRON WORKS, OF SAME PLACE.

STONE-BREAKING MACHINE.

SPECIFICATION forming part of Letters Patent No. 272,233, dated February 13, 1883.

Application filed February 17, 1879. Patented in England May 7, 1881, No. 1,995; in France May 7, 1881, No. 142,733; in Belgium May 9, 1881, No. 54,578, and in Canada July 26, 1881, No. 13,178.

*To all whom it may concern:*

Be it known that I, PHILETUS W. GATES, a citizen of the United States, residing at Chicago, in the county of Cook and State of Illinois, have invented a new and useful Improvement in Stone-Breakers, of which the following is a specification.

My invention consists, first, in the combination with the concave, crusher-head, crushing-shaft and suitable mechanism for operating the crusher-shaft, of the outer frame or shell having an inclined discharging and shielding chute, forming a bearing below the crusher-head, and a loose dust-excluding collar, this construction affording greater room than the ordinary diaphragm-chute for the passage of broken stone, while the dust from the stone broken between the crusher-head and concave is more effectually prevented from passing down upon the mechanism or gearing and into the oil step-box below the diaphragm; second, in a novel combination of parts, whereby the bevel-wheel which revolves the crusher-shaft and crusher-head can be applied on top of an oil step-box formed on the base-plate of the machine, and its eccentrically-bored hub-like extension, which forms a bearing for the lower journal portion of the shaft to revolve in while it is being gyrated, is suspended within said oil step-box, and is kept constantly lubricated; and whereby, also, the gearing and oil step-box are shielded from stone-dust, which would clog the gearing and the lubricating material in the oil step-box; and whereby, likewise, the end of the shaft is allowed to rest upon a step-block which is sustained by an adjusting-screw screwed into the bottom of the otherwise closed oil step-box; third, in a novel combination of a safety break-pin and its adjuncts with the gearing and crusher-shaft of the machine, as will be hereinafter set forth and specifically claimed.

Figure 1:
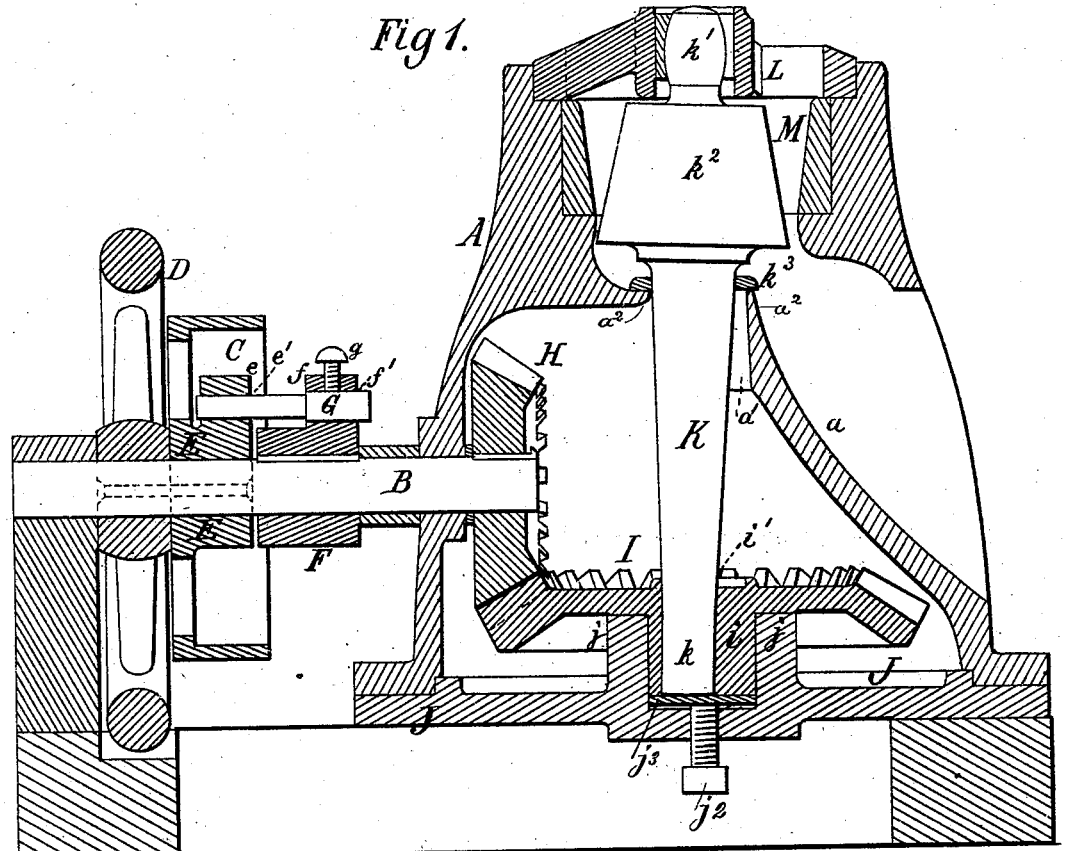
Figure 2:
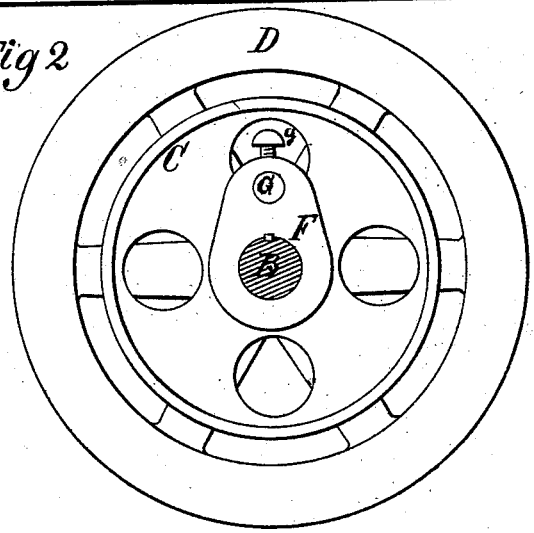

In the drawings, Figure 1 is a vertical longitudinal section of a stone-breaker with my improvements. Fig. 2 is a detail view, showing the driving-shaft in cross-section, and the safety-coupling device used in connection with the driving-shaft and driving-pulley in elevation.

In the figures, A represents the upright circular shell-frame of the crusher or stone-breaker. This frame is provided with a step-box, $j$, a diaphragm shielding chute, $a$, having an aperture, $a'$, surrounded by bearing $a^2$, a flaring concave with conical lining M, and a head or box, L, for a sliding bearing for a ball of the crusher-shaft. The step-box $j$ is formed on the base-plate J of the frame A, and it is provided with a bottom having a screw-threaded hole in it, into which an adjusting-screw, $j^2$, is screwed, and on the end of this screw a step plate or block, $j^3$, is applied. This step-box will contain the material for lubricating the journal end $k$ of the crusher-shaft, as well as the hub-like extension-bearing $i$ of the bevel-wheel I, which gyrates the revolving crusher-shaft. It is very important to lubricate the hub-like extension forming the eccentric bearing, both on its periphery and in its bore, wherein the shaft revolves, as the friction and wear are very great upon these surfaces. Within the step-box the eccentric revolving bearing $i$, constituting the hub $i'$ of the bevel-wheel I, is suspended, as shown. A revolving crusher-shaft, K, with crusher-head $k^2$ attached to it, and with a lower journal, $k$, and a ball, $k'$, at its upper end, is applied within the shell-frame A, as shown, the ball having its support in the sliding bearing of the box L, the crusher-head occupying a place within the concave, and the shaft K passing down through the bearing $a^2$ of the diaphragm-chute, and having its journal end $k$ fitted loosely in the revolving eccentric bearing $i$ of the step-box $j$, as shown.

Upon the bearing $a^2$ a loose dust-excluding collar, $k^3$, is made to rest and fit dust-tight after it has been fitted around the shaft K. The aperture $a'$ of the bearing $a^2$ is of a diameter sufficient to allow the shaft to gyrate, while the diameter of the collar is great enough to cover this aperture, notwithstanding that the collar moves laterally to an extent equal to the gyrating movement of the shaft. This collar prevents small particles of stone and dust from desending upon the gearing and clogging the same. Heretofore the conical crusher $k^2$ has been made to overhang or overtop the aperture $a'$, which of necessity was of larger diameter than the shaft K in order to permit said shaft to gyrate freely; but this construction failed to serve effectually for excluding the dust, because by drafts of air and other means dust and small particles of stone were caused to pass toward and down through the said aperture, to the injury of the gearing or other machinery below the diaphragm-chute. By locating the upper edge of the bearing $a^2$, which is around aperture $a'$, some distance below the crusher-head, the loose collar can be employed and a tightly-closed aperture secured without offering obstruction to the descending broken stone in its passage over the diaphragm-chute.

The main driving-shaft B carries a driving-pulley, C, a fly-wheel, D, and a bevel-gear wheel, H, which gears with the bevel-wheel I of the eccentric bearing $i$, and gives rotary motion to said bearing and a gyrating motion to the shaft and crusher-head, and this motion of the shaft causes the crusher-head to crush or break the stone within the concave with an impacting force, while the resistance of the stone during the breaking operation causes the shaft and its crushing-head to gradually turn backward about its own axis, the loose journal end of the shaft and the ball at its upper end permitting this action to take place.

In order to save the machine from destruction when a crow-bar or other such irresistible obstacle is presented to the crusher-head, the following means are employed, as shown in Figs. 1 and 2: The hub E of the driving-pulley and fly-wheel is loosely mounted upon the driving-shaft, and is provided with a projection, $e$, and adjacent to the hub E another hub, F, is firmly keyed to the main shaft B. This latter hub is provided with a projection, $f$, which is perforated at $f'$ on a line parallel with the main shaft, and into the perforation a long pin, G, is inserted and held in position by a set-screw, $g$. The pin G extends into the projection $e$, which for this purpose is perforated at $e'$. The pin G is unsupported midway between the projections $f$ and $e$, and as the pin is of considerable length this intermediate unsupported portion thereof will afford considerable leverage for breaking itself midway of its supported ends when pressed against at its ends by a force greater than it is intended it shall be capable of resisting, and hence it can be more readily broken in two transversely than can a pin which has its whole length or body supported.

The wheel H is provided on its face with two lugs, $h$, between which the end of the pin G is held. In connection with this modified plan of employing a long-leverage break-pin the pulley C and the wheel D are keyed to the shaft B, so that in case the pin G breaks, the pulley C, fly-wheel D, and shaft B will continue to revolve, while the cog-wheel H and other parts of the machine remain at rest.

The operation of repairing the safety break-pin coupling after it has broken is as follows: The belt is shifted to a loose pulley on the line-shafting of the shop, and the pin G is removed and a new pin substituted for the broken one, and the crusher, having been relieved of its obstruction, is started again by placing the belt back on the pulley. It is important to get access to the pin without removing the wheels from the shaft, as shown in my drawings. It is also important to employ a long-leverage break-pin, so that the pin shall quickly and easily break when the machinery is suddenly clogged.

I do not claim a safety break-pin applied to the fly-wheel of machinery, as this would not instantly stop the machine. Neither do I claim a short break-pin applied to the driving-pulley of grinding and other machines—that is, a break-pin with its entire body or length supported, and requiring a shearing action to cut it in two. Neither do I claim, broadly, a break-pin which is accessible without removing the wheels. Neither do I claim the loose collar, specifically, as my invention; but

What I claim as my invention, and desire to secure by Letters Patent, is—

1. The combination, with the concave M, the crusher-head $k^2$, the crusher-shaft K, and suitable mechanism for operating the crusher-shaft, of the outer frame or shell, A, having an inclined discharging and shielding chute, $a$, forming a bearing below the crusher-head, and the loose dust-excluding collar $k^3$, substantially as described.

2. The combination of the outer frame, provided with a base-plate having an oil step-box, with the bevel-wheel I, having an eccentric bearing suspended within the step-box, said bevel-wheel being on top of the step-box, the step-block, adjusting-screw, the gyrating-shaft passed through the eccentric bearing and resting on the step-block, the crusher-head, concave, and inclined diaphragm and shielding-chute, substantially as and for the purpose described.

3. The combination of the leverage break-pin G, hub E, hub F, fastening-screw $g$, main shaft B, driving-pulley C, bevel-gear wheels H I, and crusher-shaft K, substantially as and for the purpose described.

PHILETUS W. GATES.

Witnesses:
LOUIS P. SCOVILLE,
GEO. SCOVILLE.